United States Patent Office 3,200,144
Patented Aug. 10, 1965

3,200,144
NITRIC ACID OXIDATION OF OCTENE TO SUBERIC ACID IN THE PRESENCE OF A VANADIUM AND MANGANESE CATALYST
Pierre Baumgartner, Asnieres, and Pierre Duhaut, Le Vesinet, France, assignors to Institut Francais du Petrole des Carburants et Lubrifiants, Rueil-Malmaison, Seine-et-Oise, France
No Drawing. Filed Feb. 27, 1962, Ser. No. 176,117
Claims priority, application France, Feb. 28, 1961, 854,311
3 Claims. (Cl. 260—533)

This invention relates to a new process for manufacturing suberic acid (1,6 hexanedicarboxylic acid) comprising oxidizing cyclooctene with nitric acid, in the presence of particular catalytic materials.

It is therefore an object of this invention to provide for the catalytic conversion of cyclooctene to suberic acid.

It is another object of this invention to carry out the oxidation of cyclooctene with nitric acid in the presence of a catalytic material.

It is still another object of this invention to provide a specific catalytic composition for the oxidation of cyclooctene with nitric acid, the use of said catalyst resulting in higher yields of suberic acid.

These and other objects and advantages may become apparent upon further study of the specification and appended claims, which objects and advantages are achieved according to this invention by use of a particular catalytic composition comprising a mixture or combination of vanadium and manganese oxides either used as such or in the form of salts thereof, such as, for instance, ammonium or alkaline metal metavanadate and manganese nitrate, chloride or acetate. According to a preferred embodiment of this invention said catalytic composition comprises a mixture of vanadium pentoxide and manganese nitrate.

The use of vanadium oxide alone as a catalyst in a process for oxidizing cycloolefins, such as cyclohexene has been already proposed. Quite to the contrary, however, the use of the other catalyst component, particularly the soluble salts of manganese, is known in the art as being deleterious, because said manganese salts result in the exclusive formation of undesirable degradation products. (See in this respect J. E. Franz and W. S. Knowles, Chemistry and Industry, 1961, page 250.) It was therefore to be expected that any addition of a manganese salt or oxide to vanadium oxide in a catalytic composition for carrying out an oxidation of a cycloolefin would have been detrimental to the yield of the corresponding oxidation product due to the formation of such degradation products.

In contrast thereto, it has been surprisingly discovered that in a process for oxidizing cyclooctene with nitric acid, the combination according to this invention of vanadium and manganese compounds leads to far higher yields of suberic acid than those yields achieved by the use as catalyst of vanadium pentoxide alone.

The vanadium and the manganese compounds are employed in catalytic quantities in the invention. However, according to a preferred embodiment of this invention, the amount of manganese compound is so selected that the ratio by weight of the manganous oxide MnO to the vanadium pentoxide $V_2O_5$ is kept within the range of 0.01 to 100 and preferably between 0.1 and 10, although different values of this ratio may also be used in some cases.

The concentration of the nitric acid employed may be selected within a very wide range. It is preferred, however, to use solutions of nitric acid at a concentration of from 20 to 80% by weight, particularly between 40 and 70%, although these concentrations are not strictly prescribed.

In every case it would be of advantage to use an excess of nitric acid with respect to the stoichiometrical amount thereof, such as a proportion of 3 to 30 moles and preferably 5 to 20 moles of nitric acid per mole of cyclooctene.

For an economically desirable rate, the reaction temperature will be generally at least 50° C., and for example 100 to 120° C.; the reaction being preferably conducted under reflux. Temperatures in excess of 150° C. must be preferably avoided.

In most cases the reaction is conducted under atmospheric pressure but sub- or super-atmospheric pressures may as well be employed, the latter particularly in association with the higher temperatures.

The cyclooctene being immiscible in nitric acid, it is convenient to agitate the reactants to increase their contact surface. At the end of the reaction, the mixture is cooled and the formed suberic acid crystals are separated therefrom. Further amounts of suberic acid may be obtained by evaporation and cooling of the mother liquors.

An inert solvent for the reactants may be employed during the reaction process, and particularly a saturated hydrocarbon solvent such as, for instance, octane, methylcyclohexane, nitromethane, dioxane, ethyl ether or methanol.

It is generally deleterious to add sulfuric acid or perchloric acid to the nitric acid of the reaction mixture since such addition results, in most cases, in a lowering of the yields.

The following preferred specific embodiments of this invention, which are not to be considered as limitative in any way of the scope of the present invention, are given for illustrative purposes only.

In these experiments, vanadium pentoxide when used resulted from adding an aqueous solution of nitric acid of 30% by weight strength to an aqueous solution of sodium metavanadate of 10% by weight strength. The resulting precipitate was filtered and used as such without drying.

*Example 1*

Into a mixture containing 205 g. of 44.5% by weight nitric acid solution, 1 g. of vanadium pentoxide $V_2O_5$ and 1 g. of manganous nitrate hexahydrate

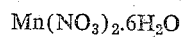

and maintained at reflux temperature under stirring, there are introduced, dropwise in four hours, 17 g. of cyclooctene.

To the resulting mixture are then added 200 g. of water and the reaction medium is cooled down to 0° C. By filtration, raw suberic acid is obtained with a yield of 74%.

A further amount of raw suberic acid is recovered by evaporating and then cooling the mother liquors. The resultant raw suberic acid melts at 140° C. after recrystallization in a 10% nitric acid solution.

In comparative experiments utilizing the same reaction conditions employed in this example, one conducted in the absence of catalyst, the yield of suberic acid was about 14%, the second in the presence of 1 g. of vanadium pentoxide alone; i.e., in the absence of manganese nitrate, a yield of only 57% of raw suberic acid was achieved.

*Example 2*

Example 1 is repeated but with a 65% by weight nitric acid solution. Raw suberic acid is then obtained with a yield of 68%.

*Example 3*

Example 1 is repeated, employing vanadium pentoxide and manganous oxide as the catalyst composition. Similar results to Example 1 are obtained.

*Example 4*

Example 1 is repeated, employing vanadium pentoxide and manganous chloride as the catalyst composition. Similar results to Example 1 are obtained.

*Example 5*

Example 1 is repeated, employing vanadium pentoxide and manganous acetate as the catalyst composition. Similar results to Example 1 are obtained.

*Example 6*

Example 1 is repeated, employing ammonium meta vanadate and manganous nitrate as the catalyst composition. Similar results to Example 1 are obtained.

*Example 7*

Example 1 is repeated, employing ammonium meta vanadate and manganous oxide as the catalyst composition. Similar results to Example 1 are obtained.

*Example 8*

Example 1 is repeated, employing ammonium meta vanadate and manganous chloride as the catalyst composition. Similar results to Example 1 are obtained.

*Example 9*

Example 1 is repeated, employing ammonium meta vanadate and manganous acetate as the catalyst composition. Similar results to Example 1 are obtained.

*Example 10*

Example 1 is repeated, employing sodium meta vanadate and manganous nitrate as the catalyst composition. Similar results to Example 1 are obtained.

*Example 11*

Example 1 is repeated, employing sodium meta vanadate and manganous oxide as the catalyst composition. Similar results to Example 1 are obtained.

*Example 12*

Example 1 is repeated, employing sodium meta vanadate and manganous chloride as the catalyst composition. Similar results to Example 1 are obtained.

*Example 13*

Example 1 is repeated, employing sodium meta vanadate and manganous acetate as the catalyst composition. Similar results to Example 1 are obtained.

*Example 14*

Example 1 is repeated, employing vanadium sesquioxide ($V_2O_3$) and manganous nitrate as the catalyst composition. Similar results to Example 1 are obtained.

*Example 15*

Example 1 is repeated, employing vanadium sesquioxide ($V_2O_3$) and manganous oxide as the catalyst composition. Similar results to Example 1 are obtained.

*Example 16*

Example 1 is repeated, employing vanadium oxychloride ($VOCl_3$) and manganous chloride as the catalyst composition. Similar results to Example 1 are obtained.

*Example 17*

Example 1 is repeated, employing vanadium oxychloride ($VOCl_3$) and manganous acetate as the catalyst composition. Similar results to Example 1 are obtained.

*Example 18*

To demonstrate the unexpected superiority of the addition of a manganese compound, Example 1 is repeated employing the manganous nitrate alone. A yield of 16% was obtained.

It is to be noted with respect to the vanadium component of the present catalyst composition, that a chemist will be able to select other suitable inorganic compounds as equivalents for the specific compounds employed in the examples. In general, the valence of the vanadium compound is 5.

With respect to the manganese component of the present catalyst composition, a chemist will also be able to select other equivalent salts, for example, other than those specifically enumerated in the examples. In general, the valence of the manganese compound is 2.

It is also apparent that mixtures of vanadium compounds may be employed with mixtures of manganese compounds to attain the unexpected results achieved by the present invention.

From the foregoing description, one skilled in the art can easily ascertain the essential characteristics of this invention and, without departing from the spirit and scope thereof, can make various changes and modifications of the invention to adapt it to various usages and conditions. Consequently, such changes and modifications are properly, equitably and intended to be within the full range of equivalence of the following claims.

What we claim is:

1. A process for manufacturing suberic acid comprising the step of contacting a nitric acid aqueous solution and cyclooctene in the presence of a catalytic composition consisting essentially of a mixture of a catalytic quantity of a vanadium compound selected from the group consisting of vanadium oxide, ammonium metavanadate and alkali metal metavanadate, and a catalytic quantity of a manganese compound selected from the group consisting of manganous oxide, manganous nitrate, manganous chloride and manganous acetate, wherein the temperature of said nitric acid aqueous solution and cyclooctene is from 50° C.–150° C., the acid concentration of said nitric acid aqueous solution is from 20–80% by weight, and the ratio of said manganese compound to said vanadium compound is 0.01 to 100% by weight.

2. The process of claim 1, wherein said temperature of said nitric acid aqueous solution and cyclooctene is 100° C.–120° C., said acid concentration of said nitric acid aqueous solution is 40–70% by weight, and said ratio of said manganese compound to said vanadium compound is 0.1 to 10% by weight.

3. The process of claim 1, wherein said vanadium compound is vanadium pentoxide and said manganese compound is manganous nitrate.

References Cited by the Examiner

UNITED STATES PATENTS

| | | | |
|---|---|---|---|
| 2,323,861 | 7/43 | Zellner | 260—533 |
| 2,698,306 | 12/54 | Matejczyk | 252—464 |
| 2,769,017 | 10/56 | Reppe et al. | 260—533 |
| 2,785,141 | 3/57 | Fleck | 252—464 |
| 3,036,124 | 5/62 | John | 260—533 |
| 3,047,622 | 7/62 | Kurhajec et al. | 260—533 |

FOREIGN PATENTS

| | | |
|---|---|---|
| 890,950 | 9/53 | Germany. |
| 939,115 | 10/63 | Great Britain. |

LORRAINE A. WEINBERGER, *Primary Examiner.*

LEON ZITVER, *Examiner.*